US006950323B2

(12) United States Patent
Achleitner et al.

(10) Patent No.: US 6,950,323 B2
(45) Date of Patent: Sep. 27, 2005

(54) METHOD FOR REGULATING AN INVERTER SYSTEM

(75) Inventors: Günter Achleitner, Sattledt (AT); Christoph Panhuber, Leonding (AT)

(73) Assignee: Fronius International GmbH, Pettenbach (AT)

(*) Notice: Subject to any disclaimer, the term of this patent is extended or adjusted under 35 U.S.C. 154(b) by 20 days.

(21) Appl. No.: 10/467,882

(22) PCT Filed: Mar. 7, 2002

(86) PCT No.: PCT/AT02/00074
§ 371 (c)(1),
(2), (4) Date: Aug. 12, 2003

(87) PCT Pub. No.: WO02/078164
PCT Pub. Date: Oct. 3, 2002

(65) Prior Publication Data
US 2004/0076028 A1 Apr. 22, 2004

(30) Foreign Application Priority Data
Mar. 9, 2001 (AT) .......................................... A 382/2001

(51) Int. Cl.⁷ .......................... H02H 7/122; H02H 7/125
(52) U.S. Cl. .......................... 363/55; 363/56.03; 363/84
(58) Field of Search .............................. 363/52, 53, 55, 363/56.03, 56.04, 84, 89

(56) References Cited

U.S. PATENT DOCUMENTS 4,494,180 A * 1/1985 Streater et al. ............... 363/37
6,320,769 B2 * 11/2001 Kurokami et al. ....... 363/56.03
6,678,174 B2 * 1/2004 Suzui et al. .................... 363/55

FOREIGN PATENT DOCUMENTS

| DE | 19937410 | 2/2001 |
|---|---|---|
| EP | 0390079 | 10/1990 |
| EP | 0780750 | 6/1997 |
| JP | 10014122 | 1/1998 |

OTHER PUBLICATIONS

Lohner A et al: "A new panel–integratable inverter concept for grid–connected photovoltaic systems" ISIE'96 Proceedings of the IEEE International Symposium on Industrial Electronics pp. 827–831.

Herrmann U et al: "Low cost DC to AC converter for photovoltaic power conversion in residential applications" pp. 588–594.

* cited by examiner

Primary Examiner—Bao Q. Vu
(74) Attorney, Agent, or Firm—Collard & Roe, P.C.

(57) ABSTRACT

The invention describes a method of regulating a rectifier inverter system (1), whereby electrical power is generated and/or supplied via a power source (6) and is transmitted from at least one d.c.-to-d.c. converter (3) to an intermediate circuit (4), from where it is fed via a d.c.-to-a.c. converter (5) to an alternating voltage supply (8) and/or delivered to a consumer. The d.c.-to-d.c. converter (3) is regulated in such a way that a virtually constant current flow is applied from the input of the d.c.-to-d.c. converter (3), in other words from the power source (6), to the output of the d.c.-to-d.c. converter (3), in other words the intermediate circuit (4), during a pre-settable period irrespective of the power drawn off from the intermediate circuit (4), whereas during this same period power is drawn off from the intermediate circuit (4) to feed it to the alternating voltage supply (8) or deliver it to the consumer. A controller or a control system of the d.c.-to-d.c. converter (3), in particular a desired value for regulating the current flow through the d.c.-to-d.c. converter (3), is re-set whenever the period elapses.

18 Claims, 2 Drawing Sheets

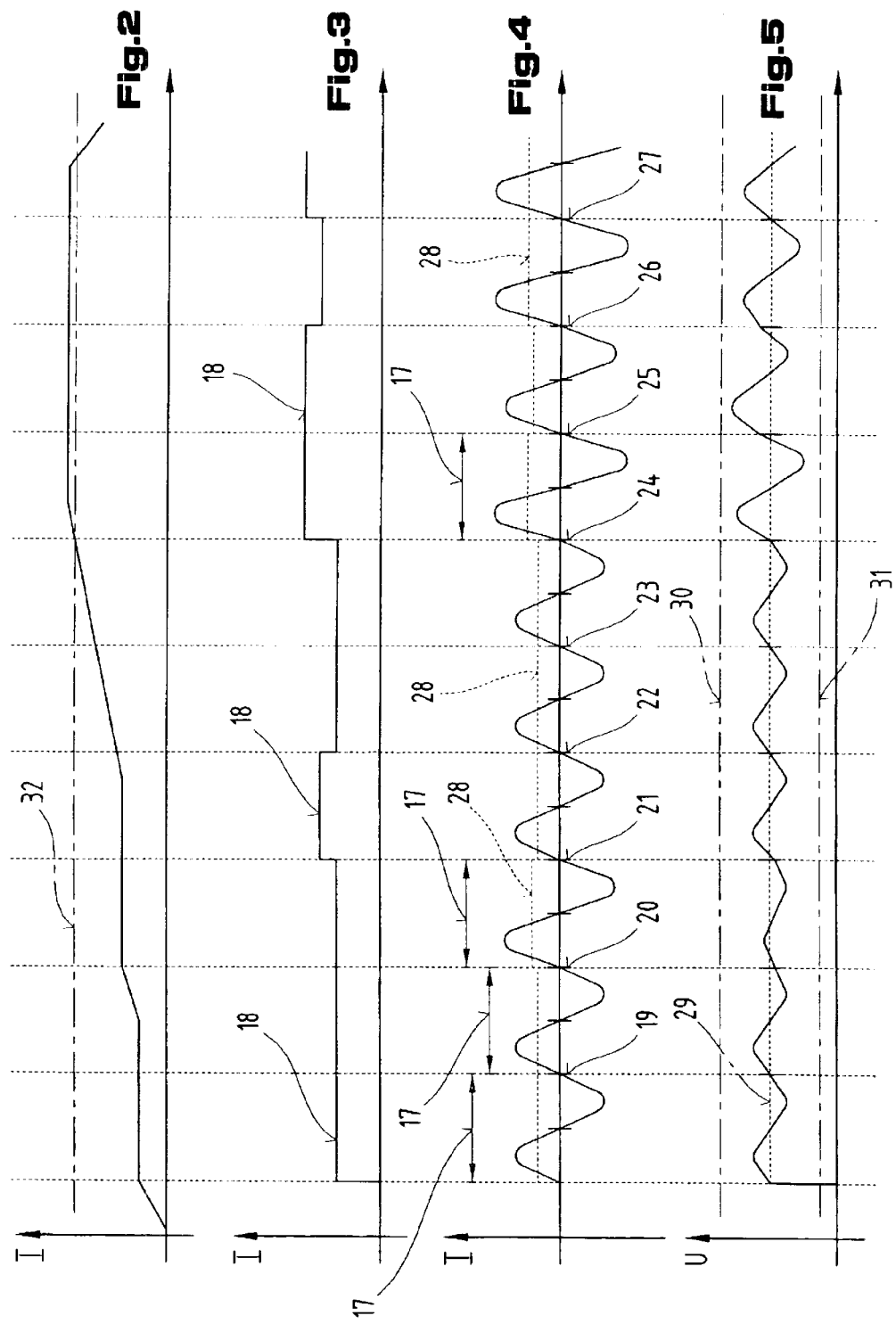

METHOD FOR REGULATING AN INVERTER SYSTEM

CROSS REFERENCE TO RELATED APPLICATIONS

Applicants claim priority under 35 U.S.C. §119 of AUSTRIAN Application No. A 382/2001 filed on 9 Mar. 2001. Applicants also claim priority under 35 U.S.C. §365 of PCT/AT02/00074 filed on 7 Mar. 2002. The international application under PCT article 21(2) was not published in English.

The invention relates to a method of regulating a rectifier inverter system as well as a rectifier inverter for this purpose, as described in the generic parts of claims 1 and 18.

A rectifier inverter system is known from an article entitled "A new panel-integratable inverter concept for grid-connected photovoltaic systems" by A. Lohner, T. Meyer and A. Nagel (Department for Power Electronics and Electrical Drivers, RWTH Aachen, University of Technology) in which a power source, in particular a solar module, is connected to a d.c.-to-d.c. converter disposed in the power source or solar module. The d.c.-to-d.c. converter has a serial resonance circuit and is connected to an intermediate circuit made up of one or more capacitors. A d.c.-to-a.c. converter is connected to the intermediate circuit and the output of the d.c.-to-a.c. converter is connected to an alternating voltage supply in order to supply power. The concept described in the article is based on the fact that the d.c.-to-d.c. converter is configured to supply a constant output and the d.c.-to-a.c. converter is configured to supply a pulsed output. The power source, in particular the solar module, also operates with direct current. The article also mentions the fact that a drawback of this system is that, because the d.c.-to-d.c. converter outputs a constant power supply or constant voltage and current supply, the voltage fluctuations of the power source are transmitted to the intermediate circuit.

Although this articles states that the underlying principle is to provide a constant power supply from the power source to the intermediate circuit, no information is given as to how an inverter system of this type should be operated. On this subject, it is even stated that the very source of the drawback is the fact that voltage fluctuations occur in the intermediate circuit. On the basis of this concept, if a constant power supply is operated from the power source via the d.c.-to-d.c. converter with a current set at a fixed level and without operating a special control process, situations can arise in which to much power is drawn from the intermediate circuit in the absence of an appropriate regulating and control system, as a result of which the inverter system shuts down or it becomes impossible to operate in a defined mode.

Other inverter systems are known, which are built in the same way as the inverter system described above. With these systems, however, a method is used to control the inverter system, whereby the d.c.-to-d.c. converter is controlled with a view to obtaining at sinusoidal current flow at a constant voltage. As a result, the intermediate circuit voltage is kept constant and the sinusoidal current flow is constantly adapted to the power drawn off from the intermediate circuit by the d.c.-to-a.c. converter. Consequently, the intermediate circuit is always supplied with sufficient power by the d.c.-to-d.c. converter, thereby making a shutdown down and indefinable operation impossible.

The underlying objective of the invention is to propose a method of regulating a rectifier inverter system and a rectifier inverter suitable for this purpose, whereby allowance is made for a deliberate fluctuation in the intermediate circuit voltage or intermediate circuit power, simultaneously ensuring reliable operation of the rectifier inverter and the rectifier inverter system.

This objective is achieved due to the fact that the d.c.-to-d.c. converter is regulated in such a way that an almost constant current flow is applied from the input of the d.c.-to-d.c. converter, in other words from the power source, to the output of the d.c.-to-d.c. converter, in other words in the intermediate circuit, for a pre-settable period of time, irrespective of the power drawn off from the intermediate circuit, whereas within this same period of time, the d.c.-to-a.c. converter draws power from the intermediate circuit in order to supply the alternating voltage supply and/or to supply a consumer, and when this period has elapsed, a regulator and a control system of the d.c.-to-d.c. converter is re-set, in particular a new desired value for controlling the current flow through the d.c.-to-d.c. converter.

The advantage of this approach is that as a result of the constant current supply or the constant power flow via the d.c.-to-d.c. converter, the conductivity losses of the d.c.-to-d.c. converter can be very significantly reduced. This is achieved due to the fact that, because the conductivity losses of the switching systems used increase by the square of the current level, the maximum current level is significantly lower with this type of control than is the case with known inverters, because by supplying a sinusoidal current across the d.c.-to-d.c. converter to keep the intermediate circuit constant, very high current peak values occur. The periods of strong current or current peak values therefore have an over-proportionately strong effect. Another advantage resides in the fact that with this system, no peak values of the power loss occur because the power losses remain virtually constant during operation, thereby providing a very simple means of dispelling the dissipated power, which occurs in the form of heat. In the case of inverters known from the prior art where peak losses occur, it is necessary to provide appropriate equipment to dissipate peak losses, in particular cooling units, fans, etc., which must be rated to handle the maximum possible and permissible peak losses or temperatures, making the construction size and cost of producing inverters of this type significantly higher.

Another major advantage resides in the fact that in spite of a constant current flow across the d.c.-to-d.c. converter, the power of the power supply at the intermediate circuit can be adapted by means of a special regulating and control method without very high current peaks, which means that it is possible to operate inverters of this type for long periods. Also of advantage is the fact that, because the current drawn from the power source is constant, no voltage fluctuations occur at the input of the d.c.-to-d.c. converter, enabling a significant reduction in the input capacities of the smoothing capacitors for the power source. This means that operation can be run at the optimum working point, in particular at the MPP-point, of the power source or solar module because voltage fluctuations do not occur and the working point is not susceptible to unforeseeable shifting. Controlling the d.c.-to-d.c. converter at a constant current flow also means that the maximum current level is lower, thereby enabling components of considerably smaller dimensions to be used, which reduces the cost of manufacturing the d.c.-to-d.c. converter accordingly.

Other advantageous features are defined in claims 2 to 17. The resultant advantages may be found in the description.

The invention will be described in more detail with reference to the embodiments illustrated as examples in the appended drawings.

Of these:

FIG. 2 is a simplified, schematic diagram, plotting a characteristic curve of the current at the output of the power source of the rectifier inverter system;

FIG. 3 is a simplified, schematic diagram plotting a characteristic curve of the current at the output of a d.c.-to-d.c. converter of the rectifier inverter system;

FIG. 4 is a simplified, schematic diagram plotting a characteristic curve of the current at the output of the d.c.-to-a.c. converter of the rectifier inverter system;

FIG. 5 is a simplified, schematic diagram plotting a characteristic curve of the intermediate circuit voltage in the intermediate circuit of the rectifier inverter system.

Figure 1:
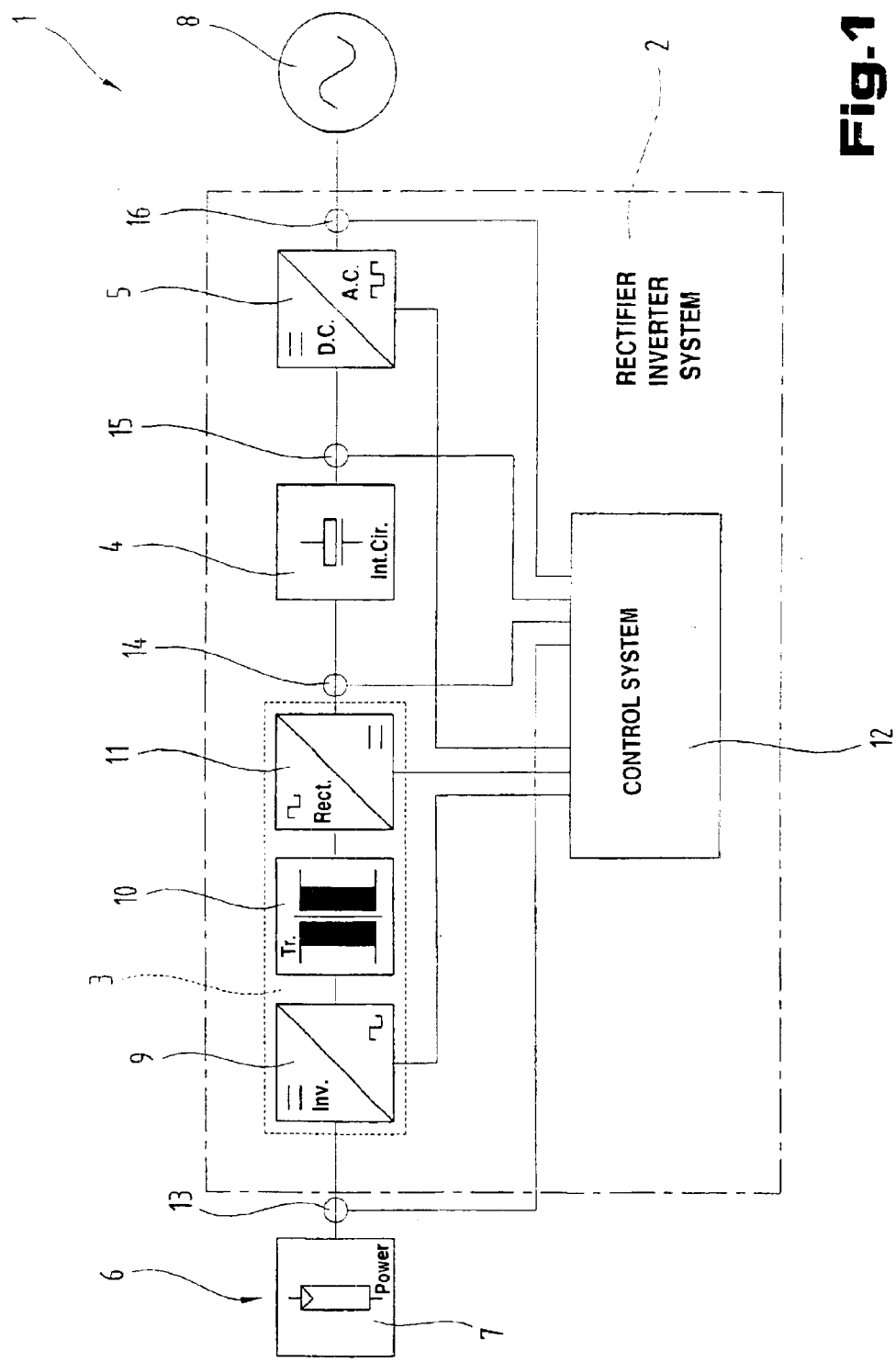
FIG. 1 is a simplified, schematic drawing showing a block diagram of a rectifier inverter system with the key components.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIGS. 1 to 5 depict a standard structure, in the form of a block diagram in particular, of a rectifier inverter system 1 with a rectifier inverter 2 (framed by dotted-dashed lines). Since the individual components or units and functions of the rectifier inverter system 1 are already known, they will not be described in detail. FIGS. 2 to 5 show different characteristic curves intended to provide a more detailed illustration of the operating principle of the rectifier inverter 2.

The rectifier inverter 2 has a d.c.-to-d.c. converter 3 (framed by broken lines), an intermediate circuit 4 and a d.c.-to-a.c. converter 5, for example. A power source 6 or power generator is connected to the d.c.-to-d.c. converter 3, which may be provided in the form of one or more solar modules 7, for example, connected in parallel or in series, referred to as a string, or a battery (not illustrated). At its outputs, the d.c.-to-a.c. converter 5 is connected to an alternating voltage supply 8 and/or one or more consumers not illustrated, such as a refrigerator, a radio set, etc.

The d.c.-to-d.c. converter 3 is made up of at least one inverter 9, a transformer 10 and a rectifier 11, for example. The intermediate circuit 4 is made up of one or more capacitors. In order to be able to generate a desired alternating voltage for the alternating voltage supply 8 or the consumer, the d.c.-to-a.c. converter 5 is provided in the form of an appropriate inverter, which converts the direct voltage into alternating voltage. Other components or units, such as filters, smoothing capacitors, etc., are not illustrated in the embodiment depicted as an example here.

The key factor about this known configuration is the method used to control and regulate operation of the rectifier inverter 2, which will be described in more detail below.

For this purpose, the rectifier inverter 2 has a controller and a control system 12, which may be a microprocessor, a micro-controller or a computer, for example. Individual units, in particular the switching systems disposed therein, can be controlled accordingly via the control system 12. The individual regulating and control procedures needed for this purpose are stored in the control system 12 in appropriate software programmes and/or data or characteristic curves. The control system 12 is also provided with a measuring system 13 to 16 for detecting the current and voltage at the various points of the rectifier inverter system 1.

The solution proposed by the invention is based on a special method of controlling and regulating the d.c.-to-d.c. converter 3 of the rectifier inverter 2. Accordingly, the control system 12 operates the d.c.-to-d.c. converter 3 in such a way that it applies a pre-set constant current or current value 18 to supply the intermediate circuit 4 with power for a pre-settable period of time 17. The period 17 during which the d.c.-to-d.c. converter 3 is operated at a fixed pre-set current value 18 may be defined on the basis of a variable number of periods or half-periods or a period of time which may be fixed by any other means. By preference, the period 17 is defined on the basis of the number of pre-settable periods or half-periods, these periods and half-periods being dependent on the alternating voltage generated by the d.c.-to-a.c. converter 5, i.e. the control and regulation mode of the rectifier inverter 2 will be initiated depending on the number of periods and half-periods set by the control system 12, in particular by varying at least one desired value. In the meantime, in other words within the period 17, the detected actual values will be not be regulated to the pre-set desired values except for or by the individual components or units. In the embodiment illustrated as an example here, the period 17 was set on the basis of periods, for example, and the number of pre-set periods or half-periods was selected as being "one", in other words one period or two half-periods, as may be seen from FIG. 4.

Once the period 17 has elapsed, the power supply, in particular the constant current flow or the current value 18, from the d.c.-to-d.c. converter 3 to the intermediate circuit 4 is adapted by the control system 12 to the power drawn off from the intermediate circuit 4 via the d.c.-to-a.c. converter 5, as may be seen at periods 19 to 27. To this end, the control system 12 detects a mean value 28, in particular a current mean value, as schematically indicated by broken lines in FIG. 4, of the amount of power drawn off from the intermediate circuit 4 by the d.c.-to-a.c. converter 5 during the period 17 and the set number of periods and half-periods. This mean value 28 is then applied as the desired value for the current flow or the current value 18 of the d.c.-to-d.c. converter 3 for the next period 17. Consequently, it may be said that the line representing the mean value 28 in FIG. 4, indicated by broken lines, more or less corresponds to the characteristic curve of the output current for the d.c.-to-d.c. converter 3 in FIG. 3, the characteristic curve in FIG. 3 being shifted by the period 17.

Consequently, whenever a period 17 elapses, a new desired value is set for the next period 17, in other words a new current value 18, i.e. the output of the power supply to the intermediate circuit 4 is adapted to the amount of power last drawn off, in other words the amount of power drawn off during the period 17 just elapsed. In the embodiment illustrated as an example in FIG. 3, the adaptation made to the current value 18 may be seen more particularly at the times 21 and 26, since a change occurred in the d.c.-to-a.c. converter 5 at these times 21 and 26 during the preceding period 17, thereby making it necessary to adapt the desired value or the current value 18 for the d.c.-to-d.c. converter 3.

However, because the adjustment is delayed, the d.c.-to-d.c. converter 3 is able to supply so much power to the intermediate circuit 4 at a substantially constant current flow that an intermediate circuit mean value 29, indicated by broken lines in FIG. 5, in particular the mean value of the intermediate circuit voltage, is held constant, as a result of which the intermediate circuit voltage in the intermediate circuit 4 fluctuates from the power source 6 by the amount of power drawn off by the d.c.-to-a.c. converter 5, as schematically illustrated in FIG. 5, due to the constant power transmission and due to the virtually constant supply of current form the d.c.-to-d.c. converter 3.

It is precisely because of this delayed power adjustment that it is possible to operate a constant current flow at a defined desired value or current value 18 for the pre-set period 17, by contrast with the prior art systems in which a constant power adjustment and hence regulation has to be applied. As a result, the constant regulations which need to be applied for the components or units of the rectifier inverter 2 are much less complex, enabling several factors crucial to optimising the power supply to be taken into account. By reducing the complexity of the regulations needed, the control system 12 may be built using inexpensive components which operate at a low speed or clock frequency.

Naturally, it would also be possible for the d.c.-to-d.c. converter 3 and the d.c.-to-a.c. converter 5 to have a separate, independent control system or controller, connected to the control system 12, or to dispense with the control system 12 altogether, in which case the regulating and control procedures would be managed by the relevant controllers.

To enable an optimum power adjustment to be made, it is also possible for the mean value 28 determined by the control system 12 to be corrected or adjusted to a different value by means of stored or detected data and values or parameters. This being the case, the control system 12 may correct the mean value 28 or set the mean value 28 by determining a value for an amount of power based on the ratio of the quantity of power supplied, as illustrated in FIG. 3, to the quantity of power or level of current drawn off from the intermediate circuit 4, indicated in FIG. 4, during a period 17 or the set number of periods or half-periods.

Since the rectifier inverter 2, in particular the d.c.-to-d.c. converter 3, is controlled and regulated independently of the power drawn off by the d.c.-to-a.c. converter 5 during the period 17, it is necessary to ensure that there is also sufficient power available in the intermediate circuit 4, since the rectifier inverter 2 might otherwise shut down or be susceptible to operation in an undefined manner. This problem can be overcome by monitoring the intermediate circuit voltage in the intermediate circuit. Accordingly, if the intermediate circuit voltage falls below at least one pre-settable reference value 30, 31, indicated by dotted-dashed lines in FIG. 5, the power supply from the d.c.-to-a.c. converter 5 to the alternating voltage supply 8 or at the consumer is reduced whereas if it exceeds the reference value 30, 31, the power supply from the d.c.-to-a.c. converter 5 to the alternating voltage supply 8 is increased by the intermediate circuit voltage. This regulation or control is preferably operated independently of the set period 17, in other words may be applied at any time, which will enable the power flow to be adapted as quickly as possible. Naturally, however, it would also be possible to operate this regulation or control in synchronisation with the period 17, in other words at the end of every period 17.

In order to guarantee reliable operation of the rectifier inverter system 1, when the period 17 has elapsed or after a period or half-period or after the fixed number of periods or half-periods, the control system 12 can determine an intermediate circuit mean value 29 of the amount of power in the intermediate circuit 4, thereby enabling action to be taken accordingly if the intermediate circuit 4 is drawing off too much or too little power. This being the case, the control system will then compare the intermediate circuit mean value 29 with stored, preferably adjustable reference values 30, 31, which may also be adjustable independently of the reference values 30, 31 for the intermediate circuit voltage, and if a reference value 30, 31 is exceeded, the output power of the d.c.-to-a.c. converter 5 is increased, for example, whereas if the output power of the d.c.-to-a.c. converter 5 falls below a reference value 30, 31, the output power of the d.c.-to-a.c. converter 5 is reduced.

Consequently, the output power can always be adapted when the period 17 has elapsed, whatever the circumstances, because of the amount of power available in the intermediate circuit 4, so that any consumers can be switched on or off or operated, and more or less power supplied to the alternating voltage supply 8.

Naturally, whilst the d.c.-to-a.c. converter 5 can be adapted to the status of the intermediate circuit 4, it would also be possible to control the d.c.-to-d.c. converter 3 accordingly. To this end, when the defined reference value 30, 31, which may also be adjusted for the d.c.-to-a.c. converter 5 for example, is exceeded, the desired value or the current value 18 for the d.c.-to-d.c. converter 3 can also be increased by an intermediate circuit mean value 29 if there is a sufficient amount of power available from the power source 6, i.e. if the reference value 30, 31 is exceeded, the control system 12 will check how much power is available in the power source 6 in order to apply a corresponding increase to the desired value. If too little power is available, the output power of the d.c.-to-a.c. converter 5 will be decreased instead of increasing the desired value so as to supply the intermediate circuit 4 with sufficient power again.

This enables the control system 12 to monitor the amount of power available in the power source 6. The output power of the d.c.-to-a.c. converter 5 can therefore be adjusted on the basis of the amount of power generated or supplied. This can be operated in such a way that if the at least one power characteristic value 32, indicated in FIG. 2, is exceeded, the output power of the d.c.-to-a.c. converter 5 can be increased by the power or voltage and current generated by the power source 6, as may be seen at time 24, or reduced in the event of a drop. The adjustment to the d.c.-to-d.c. converter 3 does not have to be applied at this time 24 because this process takes place on the elapse of the period 17 on the basis of an amended mean value 28. However, if there were an unforeseen increase in the output power, it would also be possible to adjust the desired value for the d.c.-to-d.c. converter 3 immediately.

The rectifier inverter system 1 may also be operated in such a way that both the alternating voltage supply 8 and/or one or more consumers can be supplied, in which case the control system 12 will ascertain from the amount of power available whether it should be supplied to one or more connected consumers or to the alternating voltage supply 8. To this end, the operator can set up a priority-dependent adjustment so that the connected consumers can be automatically switched on or off by the control system 12 depending on the amount of power available, as illustrated in FIG. 4.

In principle, therefore, it may be said that the d.c.-to-d.c. converter 3 is regulated so that a virtually constant current flow is applied from the input of the d.c.-to-d.c. converter 3, in other words from the power source 6, to the output of the d.c.-to-d.c. converter 3, in other words to the intermediate circuit 4, during a pre-settable period 17, irrespective of the amount of power drawn off from the intermediate circuit 4, whereas within this same fixed period 17, the d.c.-to-a.c. converter 5 draws power from the intermediate circuit 4 to feed the alternating voltage supply 8 and/or to supply a consumer, and whenever the fixed period 17 elapses, the controller or the control system 12 of the d.c.-to-d.c. converter 3 is re-set, in particular a desired value or current value 18 for controlling the current flow is re-set. In order to make the best possible use of the rectifier inverter system 1, the control system 12 regulates the rectifier inverter system 1 in such a way that the power supply of the d.c.-to-a.c. converter 5 is fixed depending on the amount of power or output generated by the power source 6, i.e. the output power of the d.c.-to-a.c. converter 5 is fixed depending on the amount of power available at the power source 6.

For the sake of good order, it should be pointed out that in order to provide a clearer understanding of the structure of the rectifier inverter system, it and its constituent parts are illustrated to a certain extent out of proportion and/or on an enlarged scale and/or on a reduced scale.

The underlying objectives of the solutions proposed by the invention may be found in the description.

Above all, the individual embodiments illustrated in FIGS. 1, 2, 3, 4, 5 may be construed as independent solutions proposed by the invention in their own right. The associated objectives and solutions may be found in the detailed description of these drawings.

List of reference numbers

1 Rectifier inverter system
2 Rectifier inverter
3 d.c.-to-d.c. converter
4 Intermediate circuit
5 d.c.-to-a.c. converter
6 Power source
7 Solar module
8 Alternating voltage supply
9 Inverter
10 Transformer
11 Rectifier
12 Control system
13 Measuring system
14 Measuring system
15 Measuring system
16 Measuring system
17 Period
18 Current value
19 Time
20 Time
21 Time
22 Time
23 Time
24 Time
25 Time
26 Time
27 Time
28 Mean value
29 Intermediate circuit mean value
30 Reference value
31 Reference value
32 Power characteristic value

What is claimed is:

1. Method of regulating a rectifier inverter system, whereby electrical power is generated and/or supplied via a power source, in particular via at least one solar module or via a battery, which is transmitted from at least one d.c.-to-d.c. converter to an intermediate circuit, from where it is fed via a d.c.-to-a.c. converter to an alternating voltage supply and/or delivered to a consumer, wherein said d.c.-to-d.c. converter is regulated in such a way that an almost constant current flow is applied from said power source, to said intermediate circuit, during a pre-settable period irrespective of the power drawn off from said intermediate circuit, whereas during this same period the d.c.-to-a.c. converter draws off power from said intermediate circuit to feed it to said alternating voltage supply or deliver it to said consumer, and a controller or a control system of said d.c.-to-d.c. converter, in particular a desired value for regulating the current flow through the d.c.-to-d.c. converter, is re-set whenever said period elapses and an adaption is made for a successive period at times wherever a preceding period elapses.

2. Method as claimed in claim 1, wherein the period is defined by a variable number of periods or half-periods or a period set in any other manner.

3. Method as claimed in claim 1, wherein the d.c.-to-d.c. converter supplies so much power to the intermediate circuit at an almost constant current flow that an intermediate circuit mean value of the intermediate circuit, in particular a mean value of the intermediate circuit voltage, is kept constant.

4. Method as claimed in claim 1, wherein the power supply, in particular the current, from the d.c.-to-d.c. converter to the intermediate circuit, is adapted to the amount of power drawn off from the intermediate circuit by the d.c.-to-a.c. converter whenever a period elapses or when the set number of periods or half-periods has elapsed.

5. Method as claimed in claim 1, wherein in order to regulate the d.c.-to-d.c. converter, a control system determines a mean value for the amount of power drawn off from the intermediate circuit by the d.c.-to-a.c. converter during the set number of periods or half-periods and the resultant mean value is applied as the desired value for the current flow of the d.c.-to-d.c. converter for the next number of periods or half-periods.

6. Method as claimed in claim 1, wherein the mean value determined by the control system is corrected by stored or detected data and values or parameters.

7. Method as claimed in claim 1, wherein for the purposes of correcting the mean value or fixing the mean value, the control system determines a value representing an amount of power based on the ratio of the amount of power supplied to the amount of power off, to or from the intermediate circuit, during the fixed number of periods or half-periods.

8. Method as claimed in claim 1, wherein the intermediate circuit voltage in the intermediate circuit fluctuates from the power source depending on the power drawn off by the d.c.-to-a.c. converter as a result of the constant power transfer or the almost constant current supply to the d.c.-to-d.c. converter.

9. Method as claimed in claim 1, wherein the power supply of the d.c.-to-a.c. converter is fixed depending on the amount of power or output generated by the power source.

10. Method as claimed in claim 1, wherein if the intermediate circuit voltage falls below a pre-settable reference value, the power supply to the alternating voltage supply and/or the consumer from the d.c.-to-a.c. converter is reduced.

11. Method as claimed in claim 1, wherein if at least one reference value is exceeded by the intermediate circuit voltage, the power supply to the alternating voltage supply and/or to the consumer is increased by the d.c.-to-a.c. converter.

12. Method as claimed in claim 1, wherein when a period or a half-period or the fixed number of periods or half-periods has elapsed, the control system determines an intermediate circuit mean value for the amount of power in the intermediate circuit.

13. Method as claimed in claim 1, wherein the intermediate circuit mean value is compared with stored, preferably adjustable reference values and if a reference value is exceeded, the output power of the d.c.-to-a.c. converter is increased and if there is a drop below a reference value the output power of the d.c.-to-a.c. converter is reduced.

14. Method as claimed in claim 1, wherein if the intermediate circuit mean value falls below a defined reference value, the desired value for the d.c.-to-d.c. converter, in particular the desired value for the constant current flow, is increased if there is a sufficient amount of power available in the power source.

15. Method as claimed in claim 1, wherein the amount of power available in the power source is monitored.

16. Method as claimed in claim 1, wherein the control system determines, on the basis of the amount of power available, whether the latter should be delivered to one or more connected consumers or to the alternating voltage supply.

17. Method as claimed in claim 1, wherein the control system automatically switches the connected consumer on or off depending on the amount of power available.

18. Rectifier inverter comprising at least one d.c.-to-d.c. converter, an intermediate circuit and a d.c.-to-a.c. converter, to which a power source or a power generator, in particular a solar module, and/or a battery can be connected and the latter can be connected to an alternating voltage supply and/or one or more consumers, wherein said d.c.-to-d.c. converter is configured so as to supply an almost constant current flow for a pre-settable period irrespective of the power drawn off from said intermediate circuit by said d.c.-to-a.c. converter and, when said pre-set period has elapsed, a desired value or a desired current of said d.c.-to-d.c. converter can be adapted to the power drawn off from said intermediate circuit by said d.c.-to-a.c. converter and an adaption is made for a successive period at times whenever a preceding period elapses.

* * * * *